(12) United States Patent
Redweik

(10) Patent No.: US 7,844,526 B1
(45) Date of Patent: Nov. 30, 2010

(54) NET PRESENT VALUE ATTRITION FOR LIFE-TIME VALUE FINANCIAL PROCESSING IN A RELATIONAL DATABASE MANAGEMENT SYSTEM

(75) Inventor: Peter Hans Redweik, Menifee, CA (US)

(73) Assignee: Teradata US, Inc., Miamisburg, OH (US)

( * ) Notice: Subject to any disclaimer, the term of this patent is extended or adjusted under 35 U.S.C. 154(b) by 1421 days.

(21) Appl. No.: 10/644,169

(22) Filed: Aug. 20, 2003

(51) Int. Cl.
G06Q 40/00 (2006.01)
(52) U.S. Cl. .................................................. 705/36 R
(58) Field of Classification Search .................. 705/36
See application file for complete search history.

(56) References Cited

U.S. PATENT DOCUMENTS

| | | | |
|---|---|---|---|
| 5,189,608 A | 2/1993 | Lyons et al. | |
| 5,249,120 A | 9/1993 | Foley | |
| 5,615,109 A | 3/1997 | Eder | |
| 5,655,085 A | 8/1997 | Ryan et al. | |
| 5,712,987 A | 1/1998 | Waits et al. | |
| 5,721,831 A | 2/1998 | Waits et al. | |
| 5,812,988 A * | 9/1998 | Sandretto | 705/36 R |
| 5,819,237 A | 10/1998 | Garman | |
| 5,852,811 A * | 12/1998 | Atkins | 705/36 R |
| 5,911,135 A | 6/1999 | Atkins | |
| 5,991,743 A | 11/1999 | Irving et al. | |
| 6,026,382 A | 2/2000 | Kalthoff | |
| 6,085,175 A | 7/2000 | Gugel et al. | |
| 6,233,566 B1 | 5/2001 | Levine et al. | |
| 6,240,399 B1 | 5/2001 | Frank et al. | |
| 6,253,192 B1 | 6/2001 | Corlett et al. | |
| 6,275,813 B1 | 8/2001 | Berka | |
| 6,292,787 B1 | 9/2001 | Scott et al. | |
| 6,360,210 B1 | 3/2002 | Wallman | |
| 6,393,406 B1 | 5/2002 | Eder | |
| 6,901,406 B2 * | 5/2005 | Nabe et al. | 707/102 |
| 7,082,411 B2 * | 7/2006 | Johnson et al. | 705/37 |
| 7,249,138 B1 * | 7/2007 | Wasserman | 707/102 |
| 7,447,652 B2 * | 11/2008 | Keyes et al. | 705/36 R |
| 2002/0026394 A1 | 2/2002 | Savage et al. | |
| 2002/0174049 A1 * | 11/2002 | Kitahara | 705/36 |

FOREIGN PATENT DOCUMENTS

WO  WO 03067395 A2 * 8/2003

OTHER PUBLICATIONS

Gregory, Kuhlemeyer A. "The Time Value of Money." Aug. 2000. UT Department of Finance. Nov. 27, 2007 <http://itc.utk.edu/grants/twt/2000/MBA_Prep_Summer_Tech.ppt.>.*

(Continued)

*Primary Examiner*—Stefanos Karmis
*Assistant Examiner*—Jessica L Lemieux
(74) *Attorney, Agent, or Firm*—Gates & Cooper LLP

(57) ABSTRACT

A Life-Time Value (LTV) system is a data-driven computer-facilitated financial model that provides accurate and consistent profitability projections using current period account level profitability data stored in a Relational Database Management System (RDBMS). The Life-Time Value system performs Net Present Value (NPV) and Future Value (FV) processing using business-rule and data-driven applications that embrace the current period profit components, defines forecast periods, parameters and methodologies, and applies appropriate growth values, attrition values and propensity values to an object of future value interest.

48 Claims, 9 Drawing Sheets

OTHER PUBLICATIONS

Kassing, Jay, "Profitability: Growing the Bottom Line," CSI, 1999, 43 pages.

"Canadian Bank Mines for Data-based Gold," Action Items, Dec. 2, 1997, 2 pages.

"Bank of Ireland Selects Compaq AlphaServers to Help Improve Profitability Management," Dec. 3, 1998, Compaq, 2 pages.

"Marquis Tops 300 MCIF-CRM Data Mart Clients Worldwide," Apr. 18, 2000, 2 pages.

Curley, Bob, "Royal Bank unearths profitability solution", Bank Systems & Technology, Apr. 2000, 2 pages.

Microsoft Office Excel, List of worksheet functions (by Category), 2008, 30 pages.

\* cited by examiner

NET PRESENT VALUE ATTRITION FOR LIFE-TIME VALUE FINANCIAL PROCESSING IN A RELATIONAL DATABASE MANAGEMENT SYSTEM

CROSS REFERENCE TO RELATED APPLICATIONS

This application is related to the following co-pending and commonly assigned patent applications:

Utility application Ser. No. 10/644,131, filed on Aug. 20, 2003, by Peter H. Redweik, entitled "LIFE-TIME VALUE FINANCIAL PROCESSING IN A RELATIONAL DATABASE MANAGEMENT SYSTEM,";

Utility application Ser. No. 10/644,110, filed on Aug. 20, 2003, by Peter H. Redweik, entitled "NET PRESENT VALUE FORECAST FOR LIFE-TIME VALUE FINANCIAL PROCESSING IN A RELATIONAL DATABASE MANAGEMENT SYSTEM,";

Utility application Ser. No. 10/644,171, filed on Aug. 20, 2003, by Peter H. Redweik, entitled "FUTURE VALUE PROPENSITY FOR LIFE-TIME VALUE FINANCIAL PROCESSING IN A RELATIONAL DATABASE MANAGEMENT SYSTEM,";

Utility Application Ser. No. 10/644,421, filed on Aug. 20, 2003, by Peter H. Redweik, entitled "FUTURE VALUE ATTRITION FOR LIFE-TIME VALUE FINANCIAL PROCESSING IN A RELATIONAL DATABASE MANAGEMENT SYSTEM,"; and Utility Application Ser. No. 10/644,422, filed on Aug. 20, 2003, by Brian J. Wasserman, Richard C. Schwarz and Thomas K. Ryan, entitled "SELECTOR FUNCTION FOR LIFE-TIME VALUE FINANCIAL PROCESSING IN A RELATIONAL DATABASE MANAGEMENT SYSTEM,";

all of which are incorporated by reference herein.

BACKGROUND OF THE INVENTION

1. Field of the Invention

This invention relates in general to financial processing systems performed by computers, and in particular, to the implementation of net present value attrition for life-time value financial processing using data accessed from a relational database management system.

2. Description of Related Art

Operating a business on current financials is a critical first step towards success. However, for sustained long-term growth and profitability, businesses must look beyond traditional profit and loss statements and current value measurements. Instead, businesses need to develop a clear calculation of the life-time value of every facet of the company's business, from customers and products to delivery channels. However, there are few tools available for performing these tasks.

The present invention, known as the Life-Time Value (LTV) system, satisfies these needs. The Life-Time Value system brings together the results and trends of a company's financial information, such as the measurements used to determine current profitability, and blends them with the future metrics, such as propensities, attrition rates and growth values. Using the Life-Time Value system, businesses can perform a number of analyses.

In the area of marketing, the Life-Time Value system can be used to identify long-term targets, optimize customer mix, attract, retain and maintain profitable customer relationships, and design intelligent offers targeted to specific customers. In the area of distribution, the Life-Time Value system can be used to understand channel life-time value, and enhance customer servicing, relationship management and migration. In the area of finance, the Life-Time Value system can be used to substantiate pricing and revenue mix, and rationalize cost and expense justification. In the area of product management, the Life-Time Value system can be used to provide sophisticated product design, pricing and relationships, and develop cutting-edge, future product and testing. In the area of risk management, the Life-Time Value system can be used to incorporate future exposures, hedges and fluctuations.

SUMMARY OF THE INVENTION

A Life-Time Value (LTV) system is a data-driven computer-facilitated financial model that provides accurate and consistent profitability projections using current period account level profitability data stored in a Relational Database Management System (RDBMS). The Life-Time Value system performs Net Present Value (NPV) and Future Value (FV) processing using business-rule and data-driven applications that embrace the current period profit components, defines forecast periods, parameters and methodologies, and applies appropriate growth values, attrition values and propensity values to an object of future value interest.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Overview

The Life-Time Value (LTV) system is a data-driven computer-facilitated financial modeling system that provides accurate and consistent profitability projections using current period account level profitability data stored in a Relational Database Management System (RDBMS). The LTV system performs Net Present Value (NPV) and Future Value (FV) processing using business-rule and data-driven applications that embrace current period profit components, defines forecast periods, parameters and methodologies, and applies appropriate growth values, attrition values and propensity values to a life-time value object.

Hardware and Software Environment

Figure 1:
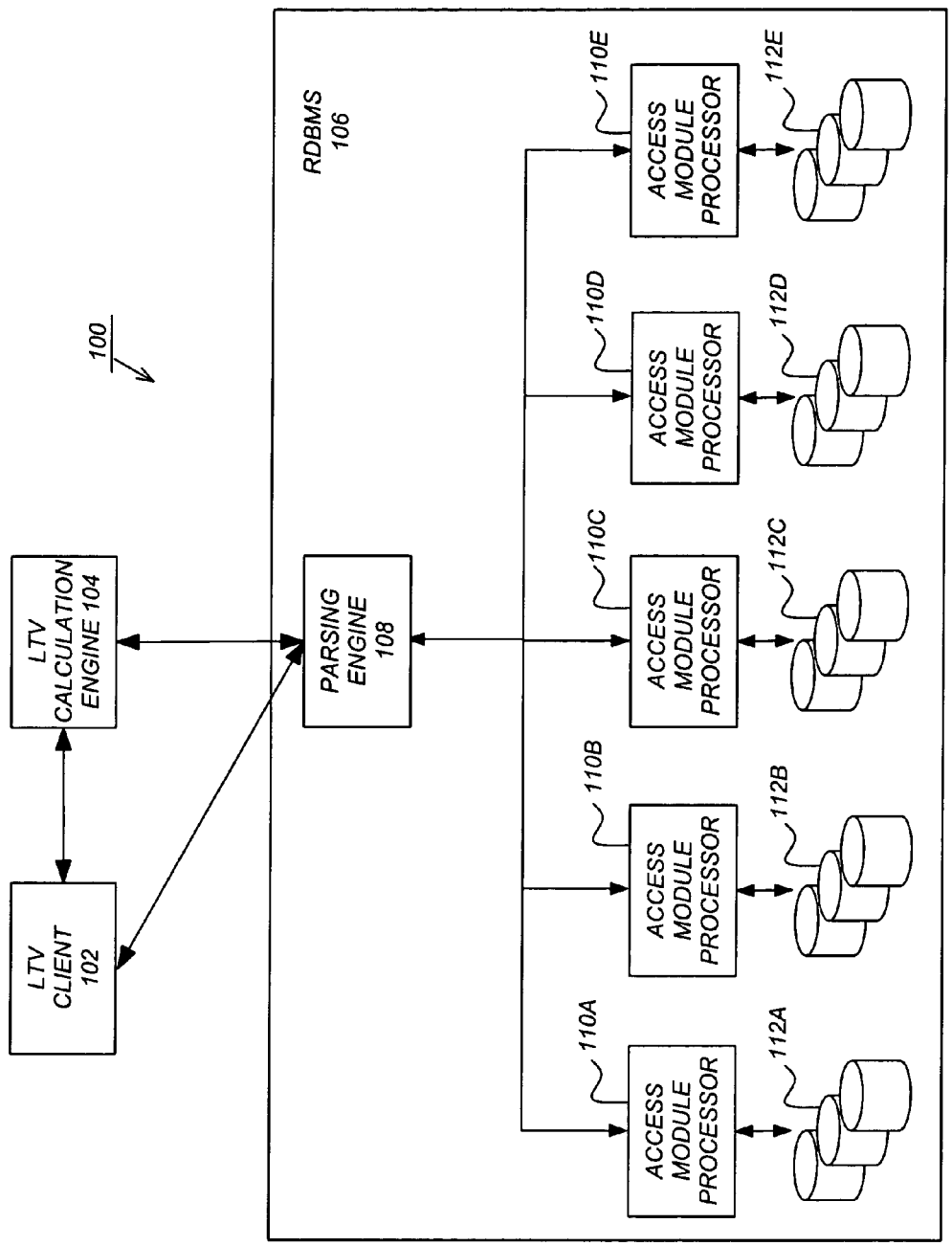
FIG. 1 illustrates an exemplary hardware and software environment according to the preferred embodiment of the present invention.

FIG. 1 illustrates an exemplary hardware and software environment according to the preferred embodiment of the present invention. In the exemplary environment, a computer system implements the LTV system 100 in a three-tier client-server architecture, wherein the first or client tier provides an LTV Value Client 102 that may include, inter alia, a graphical user interface (GUI), the second or middle tier provides an LTV Calculation Engine 104 for performing functions as described later in this application, and the third or server tier comprises an RDBMS 106 that stores data and metadata in a relational database. The first, second, and third tiers may be implemented in separate machines, or may be implemented as separate or related processes in a single machine.

In the preferred embodiment, the RDBMS 106 includes at least one Parsing Engine (PE) 108 and one or more Access Module Processors (AMPs) 110A-110E storing the relational database in one or more data storage devices 112A-112E. The Parsing Engine 108 and Access Module Processors 110 may be implemented in separate machines, or may be implemented as separate or related processes in a single machine. The RDBMS 106 used in the preferred embodiment comprises the Teradata® RDBMS sold by NCR Corporation, the assignee of the present invention, although other DBMS's could be used.

Generally, the LTV Client 102 includes a graphical user interface (GUI) for operators of the system 100, wherein requests are transmitted to the LTV Calculation Engine 104 and/or the RDBMS 106, and responses are received therefrom. In response to the requests, the LTV Calculation Engine 104 performs the functions described below, including formulating queries for the RDBMS 106 and processing data retrieved from the RDBMS 106. Moreover, the results from the functions performed by the LTV Calculation Engine 104 may be provided directly to the LTV Client 102 or may be provided to the RDBMS 106 for storing into the relational database. Once stored in the relational database, the results from the functions performed by the LTV Calculation Engine 104 may be independently retrieved from the RDBMS 106 by the LTV Client 102 or another system.

Note that the LTV Client 102, the LTV Calculation Engine 104, and the RDBMS 106 may be implemented in separate machines, or may be implemented as separate or related processes in a single machine. Moreover, in the preferred embodiment, the system 100 may use any number of different parallelism mechanisms to take advantage of the parallelism offered by the multiple tier architecture, the client-server structure of the Life-Time Value Client 102, Life-Time Value Calculation Engine 104, and RDBMS 106, and the multiple Access Module Processors 110 of the RDBMS 106. Further, data within the relational database may be partitioned across multiple data storage devices 112 to provide additional parallelism.

Generally, the Life-Time Value Client 102, Life-Time Value Calculation Engine 104, RDBMS 106, Parsing Engine 108, and/or Access Module Processors 110A-110E comprise logic and/or data tangibly embodied in and/or accessible from a device, media, carrier, or signal, such as RAM, ROM, one or more of the data storage devices 112A-112E, and/or a remote system or device communicating with the computer system 100 via one or more data communications devices.

However, those skilled in the art will recognize that the exemplary environment illustrated in FIG. 1 is not intended to limit the present invention. Indeed, those skilled in the art will recognize that other alternative environments may be used without departing from the scope of the present invention. In addition, it should be understood that the present invention may also apply to components other than those disclosed herein.

Life-Time Value Operation

Figure 2:
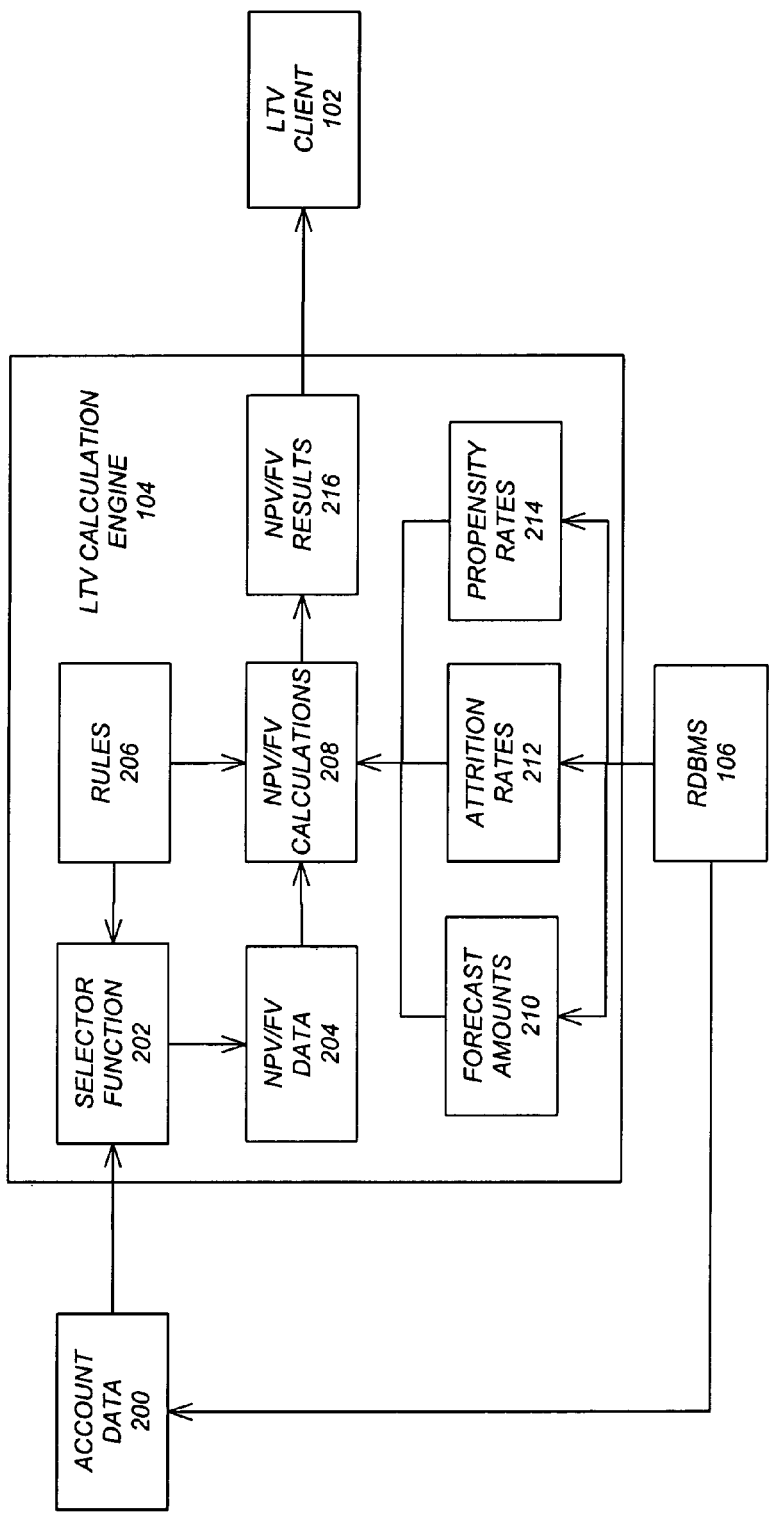
FIG. 2 is a data flow diagram that illustrates the operation of the Life-Time Value system according to the preferred embodiment of the present invention.

FIG. 2 is a conceptual data flow diagram that illustrates the operations of the LTV system 100 performed by the preferred embodiment of the present invention.

The life-time value of a customer is estimated by calculating the net present profitability value of the customer's already purchased products, as well as estimating the possible future profitability value of products the customer may buy in the future. In this context, the net present profitability value of the current product set is referred to as the Net Present Value (NPV) and the possible future profitability value is referred to as the Future Value (FV). The NPV and FV are used to give the user an indication of the life-time value of the customer.

To calculate the NPV and FV of the customer, the LTV system 100 integrates existing account data along with basic assumptions about behavior and valuations to calculate the NPV and FV for each customer. One of the basic requirements for the NPV and FV calculations is to obtain the current profitability value of the accounts for each customer.

In FIG. 2, the RDBMS 106 stores detailed information on the current profitability value of the accounts for each customer. Specifically, the RDBMS 106 provides account data 200 for use by the Life-Time Value system 100. A Selector function 202 of the LTV Calculation Engine 104 selects from this account data 200 to create the NPV/FV data 204, based on selection criteria that is specified by user input or one or more Rules 206.

The LTV Calculation Engine 104 performs one or more NPV/FV Calculations 208 on the NPV/FV data 204, based on the Rules 206, as well as Forecast Amounts 210, Attrition Rates 212 and Propensity Rates 214 accessed from the RDBMS 106 and/or otherwise defined by the user. The NPV/FV results 216 from these NPV/FV Calculations 208 provide an indication to the user of the potential profitability value of each customer. The NPV/FV results 216 can then be sent the LTV Client 102, or other systems, as desired.

Life-Time Value Logic

Figure 3:
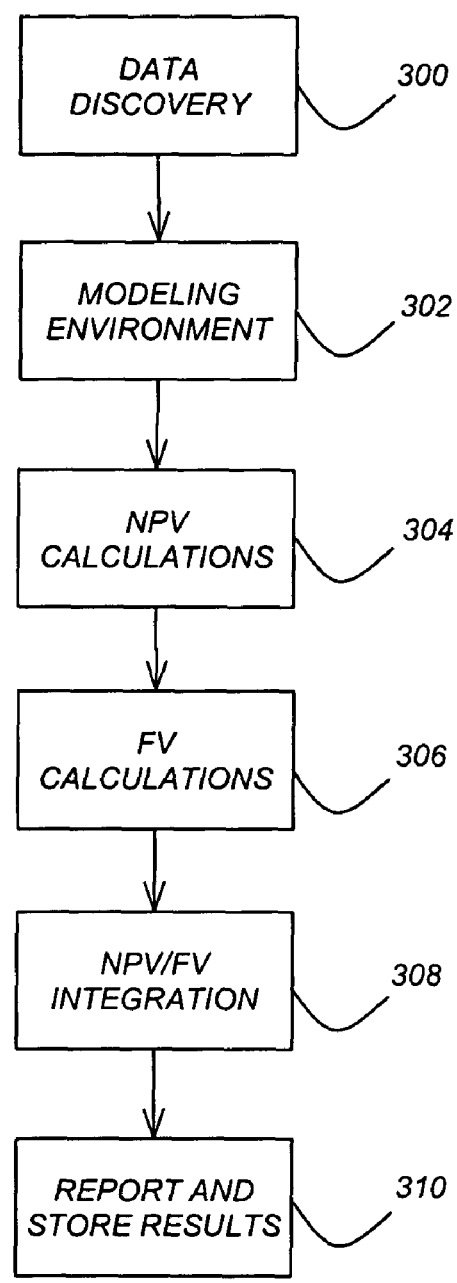
FIG. 3 is a flow chart that illustrates the logic of the Life-Time Value system according to the preferred embodiment of the present invention.

FIG. 3 is a flow chart that illustrates the logic performed by the LTV system 100 according to the preferred embodiment of the present invention.

Block 300 represents the user performing data discovery to select accounts, amounts and rates from the RDBMS 106 for use by the LTV system 100 in performing the NPV and FV calculations. This step includes developing data definitions, identifying account data including profitability data, defining sets of accounts, and specifying forecast amounts, attrition rates and propensity rates.

Block 302 represents the user defining the modeling environment for the LTV system 100. This step includes defining forecast periods and entering forecast amounts, attrition rates and propensity rates, as desired.

Block 304 represents the LTV system 100 performing the NPV calculations on the selected accounts according to the NPV forecast and attrition rules using the selected amounts and rates, wherein the NPV is a net present value of the profitability of the selected accounts. This step includes performing NPV forecast calculations, performing NPV attrition calculations on the results of the NPV forecast calculations, and generating NPV amounts from the results of the NPV attrition calculations.

Block 306 represents the LTV system 100 performing the FV calculations on the selected accounts according to the FV propensity and attrition rules using the selected amounts and rates, wherein the FV is a possible future value of the profitability of the selected accounts. This step includes performing FV propensity calculations on the selected accounts, performing FV attrition calculations on the results of the FV propensity calculations, and generating FV amounts from the results of the FV attrition calculations.

Block 308 represents the LTV system 100 integrating the results of the NPV and FV calculations. This step includes combining the NPV and FV amounts for each set of accounts.

Finally, Block 310 represents the LTV system 100 reporting and/or storing the results of the NPV and FV calculations. The results may be reported directly to the LTV Client 102 or another system, such as a CRM system. In addition, the results may be stored, for example, in the RDBMS 106 for further review and analysis.

The details concerning these various steps performed by the LTV system 100 are described in more detail below.

Data Discovery

Develop Data Definitions

In Block 300, the user will need to develop some specific information that will be used by the LTV system 100 and stored as meta-data in the RDBMS 106. This includes:

1. List of Forecast Components. This is a list of forecast components to be modeled. All rule definitions and results will have an associated forecast components. These components are item such as Net Interest Revenue (NIR) amount, ATM transaction fees, maintenance expenses, etc.

2. NPV Attrition Attributes. This is a list of attributes from which the user will create selection criteria in the NPV attrition rule definitions. These attributes enable the user to distinguish between various account level attrition rates. Attrition rates are conceptually thought of as the rate at which a cash flow will be decreased. This means that an account may have a different attrition rate for each cash flow associated with the account.

3. FV Propensity Attributes. This is a list of attributes from which the user will create selection criteria in the FV propensity rule definitions. These attributes enable the user to distinguish between various propensity rates.

4. FV Attrition Attributes. This is a list of attributes from which the user will create selection criteria in the FV attrition rule definitions. These attributes enable the user to distinguish between various attrition rates.

Baseline Account Data

In Block 300, the selected accounts include current profitability values. For example, the database of the Value Analyzer™ system provided by NCR Corporation, the assignee of the present invention, contains current profitability values by account, by rule, and by scenario, that can be used as baseline account data by the LTV system 100.

A number of attributes may be used to segment the baseline account data for each of the NPV and FV rules. These attributes may include things such as:

Product type

Geographic Code

Customer Segment Code

Balance Tier

LTV Object

Generally, the current profitability values needs to be aggregated to provide an initial amount for the NPV and FV calculations. For example, such aggregation may be used to:

1. Calculate a sustainable value by removing one-time revenues and costs.

2. Combine detailed profitability values to appropriate levels for applying forecasting assumptions.

3. Average profitability values over multiple cycles to obtain more stable values.

LTV Objects

In Block 300, each user may define "customers" or the target of the LTV calculations differently. These may be households, master accounts or corporate identifier numbers. This means a more generic term than "customer" is needed for modeling in the LTV system 100. Consequently, the LTV system 100 uses the concept of "LTV Objects." The LTV Objects are the lowest level of detail for which NPV and FV will be calculated. As a result, each account must be mapped to an LTV Object and the LTV Objects represent a set of accounts. LTV Objects are used to integrate NPV results with FV results, as described in more detail below.

Forecast, Attrition and Propensity Rates

In calculating NPV and FV, forecast amounts, attrition rates and propensity rates are applied to selected accounts associated with LTV Objects. Often, these rates have been determined by analytical means by the user for each LTV Object, and are applied only as a beginning rate to the forecast period. Thereafter, rate projection methods may be applied to the beginning rate in order to calculate a different rate for each forecast period.

Modeling Environment

Define Forecast Period

In Block 302, the user sets up a modeling environment in order to determine the forecast periods of time over which the all the calculations may be performed. These forecast periods also dictate what rates will be required and the time horizon for calculations.

Generally, the user will input the following information:

Number of Forecast Periods.

Initial Period As-of-Date.

Generally, the first period will represent the months from the As-of-Date to the end of the current calendar year. Subsequent periods will represent subsequent years. For example, period 1 will represent the months from the As-of-Date through the end of the year, while periods 2 through 11 will represent the next 10 calendar years.

This will allow the construction of a needed forecasting time horizon. For example, if the user specifies 11 forecast periods (i.e. 11 years), and the initial period As-of-Date in August 2003. This means the baseline account data was derived from averaging perhaps a year's worth of profitability numbers from the months September 2002 through August 2003. This example is illustrated below:

| Sample Forecast period | | |
|---|---|---|
| Forecast period | Begin Date Range | End Date Range |
| 1 | September 2003 | December 2003 |
| 2 | January 2004 | December 2004 |
| 3 | January 2005 | December 2005 |
| 4 | January 2006 | December 2006 |
| 5 | January 2007 | December 2007 |
| 6 | January 2008 | December 2008 |
| 7 | January 2009 | December 2009 |
| 8 | January 2010 | December 2010 |
| 9 | January 2011 | December 2011 |

-continued

Sample Forecast period

| Forecast period | Begin Date Range | End Date Range |
|---|---|---|
| 10 | January 2012 | December 2012 |
| 11 | January 2013 | December 2013 |

Although the above example shows 11 periods based on fiscal year, alternative embodiments may have different numbers of periods. Moreover, the forecast periods may be yearly, semi-yearly, quarterly, monthly, or some other interval.

Define Rates Used for Calculating Present Value

In Block 302, for each forecast period, the user will need to enter a corresponding rate to be used when calculating various values. These rates may be annual rates.

Annual Rates

| Forecast period | Annual Rate |
|---|---|
| 1 | 4.0000 |
| 2 | 4.2000 |
| 3 | 4.4000 |
| 4 | 4.6000 |
| 5 | 4.8000 |
| 6 | 5.0000 |
| 7 | 5.2000 |
| 8 | 5.4000 |
| 9 | 5.6000 |
| 10 | 5.8000 |
| 11 | 5.9000 |

After developing the baseline account data, where the forecast period and the rates are defined, the users will need to define a set of rules that will be applied to the selected accounts to project the values for each account throughout the forecast periods.

Net Present Value

NPV Calculations

Figure 4:
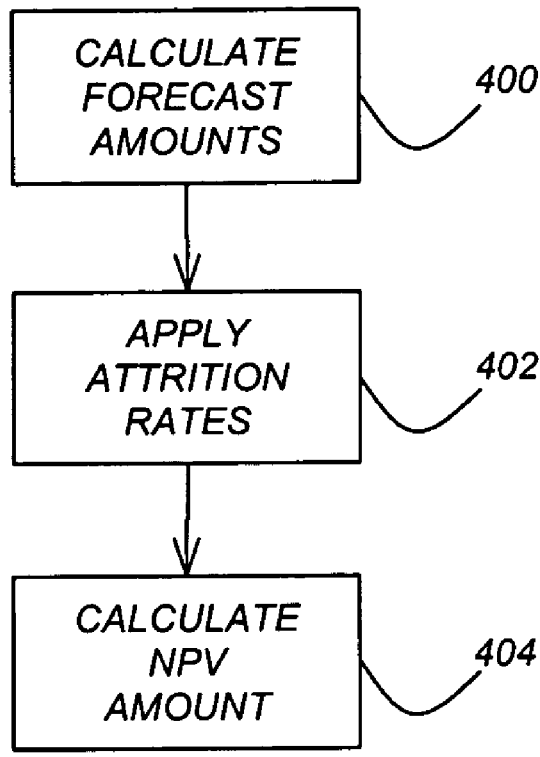
FIG. 4 is a flowchart that further illustrates the steps performed in Block 304 when performing the NPV calculations.

FIG. 4 is a flowchart that further illustrates the steps performed in Block 304 when performing the NPV calculations.

Block 400 represents the step of calculating forecast amounts for each forecast period for the selected accounts. These forecast amounts could be based on either the selected accounts' contractual data or on forecast assumptions applied to the selected accounts.

Block 402 represents the step of applying attrition rates to the calculated forecast amounts to arrive at NPV expected values, wherein the attrition rates comprise a probability that the selected account will continue to exist.

Block 404 represents the step of calculating the NPV amount by combining the NPV expected values for each forecast period for the selected accounts and discounting the combined NPV expected values.

These steps are described in more detail below.

Define NPV Forecast Rules

The following definition is used for NPV forecast rules:

1) NPV Forecast Rule Name.
2) Forecast Type:
   A) Forecast Amount. The user specifies which amount to forecast this can come from two possible sources:
      i) User Input. The user inputs a specific amount to be forecast.
      ii) Account Level attribute. The user specifies an account-level forecast component amount to forecast.
      iii) Both. If the user specifies both user input and account level forecast, the account level amount will take precedence. If there is no account level amount, then the user input will be applied to the account.
   B) Forecast Rule Type:
      i) Contractual Cash Flows. This option allows the user to select either Project Rate of Change or Amortizing.
      ii) Assumed Cash Flows. This option allows the user to select either Project Rate of Change or Constant.
   C) Forecast Component. The user selects from a set of pre-defined NPV profit components. These components are defined in the meta-data when defining the baseline account data.
   D) Forecast Term. The user specifies the term for which the account should be forecast. There are three options:
      i) User Input. The user inputs a term in months.
      ii) Account Level. The user selects from available account level attributes.
      iii) End of forecast period. The user indicates that the account should be forecast through the end of entire forecast environment.
   E) Forecast Component Selection Criteria. Selection criteria for a list of forecast components attributes. The attributes are from a set of pre-defined attributes.
3) Account Selection Criteria. The user may specify the following selection criteria:
   A) Account Attributes.
   B) Balance Types/Amounts.
   C) Product Groups.
4) Forecast Methods:
   A) Project Rate of Change:
      i) Projection Type:
         (a) Constant.
         (b) Additive.
         (c) Manual Input.
      ii) Initial Rate:
         (a) The user inputs a value expressed as a rate.
         (b) Use the rate associated with the account.
      iii) Compounding Flag. This is an indicator as to whether or not the growth rate is to be compounded for each forecast period. This can be either compounding or no compounding.
   B) Constant Amount.
   C) Amortizing:
      i) Method:
         (a) Declining Balance.
         (b) Interest Method—Unpaid Principal.
         (c) Interest Method—Paid Principal.
      ii) Amortization Rate:
         (a) User Input.
         (b) Account Level Attribute.
      iii) Amortization Term:
         (a) User Input.
         (b) Account Level Attribute.

Apply NPV Forecast Rules

Figure 5:
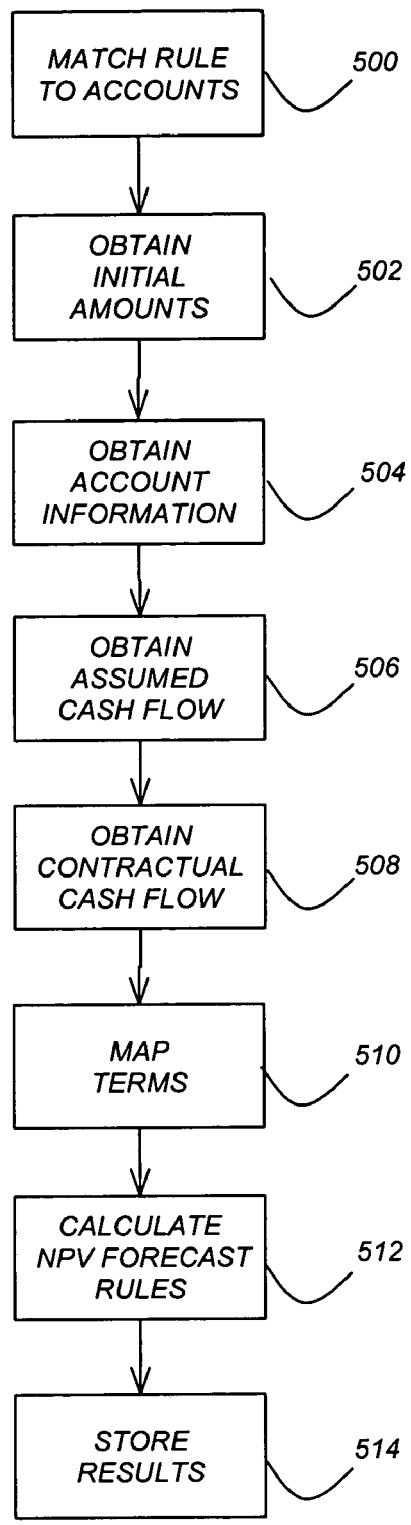
FIG. 5 is a flowchart that further illustrates the steps of performed in Block 400 when calculating the forecast amounts by applying the NPV forecast rule to the selected accounts.

FIG. 5 is a flowchart that further illustrates the steps of performed in Block 400 when calculating the forecast amounts by applying the NPV forecast rule to the selected accounts.

Block 500 represents the step of matching the NPV forecast rule against the selected accounts. This step is performed by a selector function matching selection criteria defined in the NPV forecast rule to the account data. The result is a list of accounts satisfying the selection criteria of the rule.

Block 502 represents the step of obtaining initial amounts to be forecast fore each of the matched accounts using the forecast amount selection criteria specified in the NPV forecast rule. If an account has satisfied the selection criteria, then it must be included in the result set. If the account does not have an account level forecast component to be projected, then the user input amount will be applied to the account.

Block 504 represents the step of obtaining account level information needed for the calculations. For each account, the information includes:
A) Term.
B) Projection Rate (Initial rate of growth).
C) Amortization Rate (if needed).

Block 506 represents the step of obtaining an Assumed Cash Flow for the matched accounts. This step includes the following:
A) Cash flows are to be projected for the forecast periods as determined by the forecasting term parameter.
B) Initial Amount*(1+Net Change Rate for each forecast period). The "Net Change Rate" is calculated for all rules when required. This calculation applies to Constant (no compounding), Constant (with compounding), Additive (no compounding), Additive (with compounding), Manual (no compounding) and Manual (with compounding). A more detailed description of the "Net Change Rate" formulas is provided below.

Block 508 represents the step of obtaining a Contractual Cash Flow from the matched accounts. This step includes the following:
A) Amortization term.
B) Amortization rate, if needed.

Block 510 represents the step of mapping remaining terms of the matched accounts to the forecast periods. This step includes the following:
A) Determine number of years.
B) Determine appropriate begin/end term ranges for each forecast period.

Block 512 represents the step of calculating amounts for each forecast period using an appropriate NPV forecast rule (described below). This step includes the following:
A) Use account remaining term and rate from Block 504 above.
B) Use begin/end ranges for each forecast period as determined in Block 506 above.
C) Use initial amount as obtained from Block 502 above.
D) Use information from Block 508 in the appropriate NPV forecast rule.

Block 514 represents the step of storing results by:
A) Cycle Number.
B) Rule ID.
C) Forecast Component.
D) Account Number.
E) Account Profit Qualifiers.
F) Period 1 through n.

NPV Forecast Rules

For Block 512, there are ten general categories of NPV forecast rules:
1. Constant (no compounding)
2. Constant (with compounding)
3. Additive (no compounding)
4. Additive (with compounding)
5. Manual (no compounding)
6. Manual (with compounding)
7. Declining balance
8. Interest—unpaid principal
9. Interest—paid principal
10. Constant method The calculations performed in Block 512 by each of these NPV forecast rules are provided below. Each of these rules can be processed independently of each other. This allows the user to customize the LTV system 100 to process these rules in series (the default) or in parallel.

In the rules, the following variables are used:
$Amount_i$=calculated amount by forecast period,
$Amount_0$=initial amount,
$R_0$=initial rate,
$R_m$=monthly rate,
$R_{man}$=manual rate,
i=forecast period,
j=first month in a forecast period,
k=last month in a forecast period,
n=amortization term,
r=amortization rate, and
$Compounded\_Rate=Rate_1 * Rate_2 * \ldots * Rate_i$.

1. Constant (no compounding):

$$Amount_i = Amount_0 * (1+R_0) * ((k-j+1)/12)$$

2. Constant (with compounding):

$$Amount_i = Amount_0 * (1+R_0)^i * ((k-j+1)/12)$$

3. Additive (no compounding):

$$Amount_i = Amount_0 * (1+i*(R_0/12)) * ((k-j+1)/12)$$

4. Additive (with compounding):

$$Amount_i = Amount_0 * (1+Compounded\_Rate * ((k-j+1)/12))$$

5. Manual (no compounding):

$$Amount_i = Amount_0 * (1+R_{man}) * ((k-j+1)/12)$$

6. Manual (with compounding):

$$Amount_i = Amount_0 * (1+Compounded\_Rate * ((k-j+1)/12))$$

7. Declining balance:

$$Amount_i = (k-j+1) * Amount_0 - \frac{Amount_0}{n} * \frac{(k-j+1)*(k+j)}{2}$$

8. Interest—unpaid principal:

$$Amount_i = Amount * (k-j+1) - \frac{Amount_0}{(1+r)^n - 1} * \left[ \frac{(1+r)^j - (1+r)^{k+1}}{-r} - (k-j+1) \right]$$

9. Interest—paid principal:

$$Amount_i = Amount_0 * \left[ \frac{(1+r)^{k+1} - (1+r)^j}{r} \right]$$

10. Constant method:

$$Amount_i = Amount_0$$

Define NPV Attrition Rules

The following definition is used for NPV attrition rules:
1) NPV Attrition Rule Name.
2) Attrition Rate Type:
A) User Input Value.
B) User Account Data.
C) Both. If the user checks both, then the input value is used when no account data is found.
3) Account Selection Criteria.
4) Attrition Rate Method (choose A or B):
A) Attrition Rate Projection Parameters:
   i) Projection Type:
      (a) Constant.
      (b) Additive.
      (c) Manual Input.
   ii) Initial Rate.
   iii) Compounding Flag.

Figure 6:
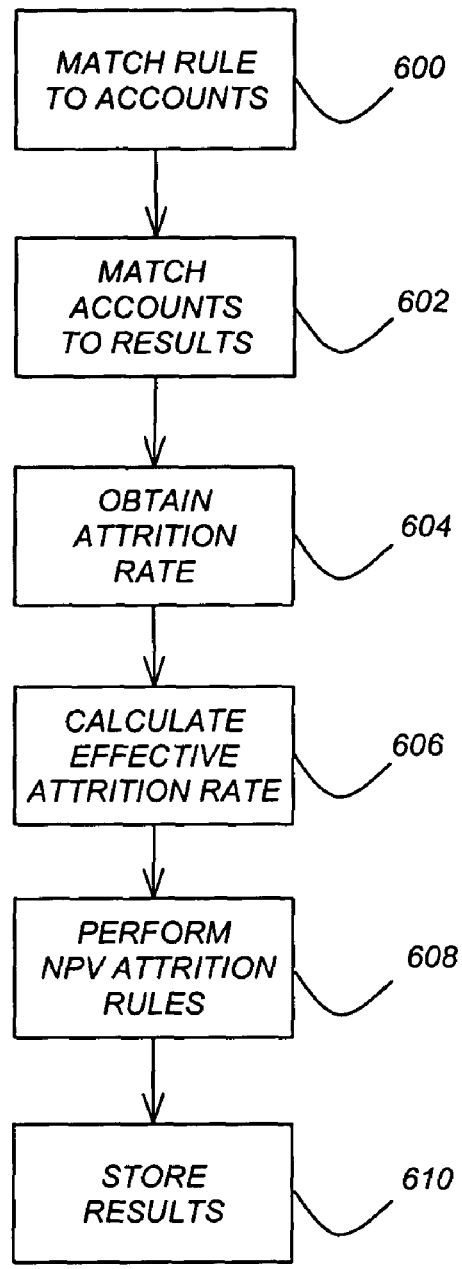
FIG. 6 is a flowchart that further illustrates the steps performed in Block 402 when applying the NPV attrition rules to the selected accounts.

B) Do Not Project Attrition Rate:
   i) Constant.
   ii) Negative Compounding Account Level rate.
5) Display Effective Attrition Rates (when there is a user input value):
   A) Attrition Type for Manual Input.
   B) Attrition Type for Constant or Additive.
6) Forecast Rules Selection.
7) Store Attrition Rates by Rule.
Apply NPV Attrition Rules FIG. 6 is a flowchart that further illustrates the steps performed in Block 402 when applying the NPV attrition rules to the selected accounts.

Block 600 represents the step of matching the NPV attrition rule against the selected accounts. This step is performed by a selector function matching selection criteria defined in the rule to the baseline account data. The result is a list of accounts satisfying the selection criteria of the rule.

Block 602 represents the step of matching the results of the NPV forecast rules to the matched accounts.

Block 604 represents the step of obtaining attrition rates for the matched accounts. This step includes the following determination:
   A) If the user has specified account data as the source of attrition rate, sum all attrition rates satisfying the attrition rate selection criteria.
   B) If the result of (A) above is 0, use the input attrition rate for all account satisfying the account selection criteria.

Block 606 represents the step of calculating an effective attrition rate for each forecast period. The effective attrition rate for each forecast period is the attrition rate from Block 604 multiplied by the Net Change Rate from the NPV attrition rule for each forecast period.

Block 608 represents the step of performing the NPV attrition rule to calculate the NPV expected value using the effective attrition rate. The NPV expected value should be calculated as:
   A) Forecast Rule Expected Value*(1−Effective Attrition Rate) for each of the forecast periods.
   B) Forecast Rule Expected Value*Effective Attrition Rate for each of the forecast periods.

In this step, after all attrition rules have been processed, an attrition rate of zero for all forecast periods should be applied to all forecast rule results to which no attrition rates have been applied. This is to insure that all forecast rule results will be included in the NPV amount.

Block 610 represents the step of storing the results from the NPV attrition rule. The results should be stored at the following level of detail:
   A) Cycle Number.
   B) Attrition rule ID.
   C) Forecast Rule ID.
   D) Forecast Component.
   E) Account Number/Modifier.
   F) Period 1 through Period n.
   G) Unattrited Expected Profit Amount Value.
   H) Attrited Expected Profit Amount Value.
NPV Attrition Rules For Block 608, there are eight general categories of NPV attrition rules:
   1. Constant (no compounding)
   2. Constant (with compounding)
   3. Additive (no compounding)
   4. Additive (with compounding)
   5. Manual (no compounding)
   6. Manual (with compounding)
   7. Constant Method
   8. Negative Compounding The calculations performed in Block 608 by each of these NPV attrition rules are provided below. Each of these rules can be processed independently of each other. This allows the user to customize the LTV system 100 to process these rules in series (the default) or in parallel.

In the rules, the following variables are used:
$Amount_i$=calculated amount by forecast period,
$Amount_0$=initial amount,
$R_0$=initial rate,
$R_m$=monthly rate,
$R_{man}$=manual rate,
i=forecast period,
j=first month in a forecast period,
k=last month in a forecast period,
n=amortization term,
r=amortization rate, and
Compounded_Rate=$Rate_1 * Rate_2 * \ldots * Rate_i$.

1. Constant (no compounding):

$$Amount_i = Amount_0 * (1+R_0) * ((k-j+1)/12)$$

2. Constant (with compounding):

$$Amount_i = Amount_0 * (1+R_m)^i * ((k-j+1)/12)$$

3. Additive (no compounding):

$$Amount_i = Amount_0 * (1+i*(R_0/12)) * ((k-j+1)/12)$$

4. Additive (with compounding):

$$Amount_i = Amount_0 * (1+Compounded\_Rate * ((k-j+1)/12))$$

5. Manual (no compounding):

$$Amount_i = Amount_0 * (1+R_{man}) * ((k-j+1)/12)$$

6. Manual (with compounding):

$$Amount_i = Amount_0 * (1+Compounded\_Rate * ((k-j+1)/12))$$

7. Constant method:

$$Amount_i = Amount_0$$

8. Negative Compounding:

$$Amount_i = Initial\ Forecast\ Amount * (Attrition\ Rate * (1-Attrition\ Rate)^n)$$

Calculate Present Value of Expected Profit Amount

As noted above, after the forecast amounts have been calculated in Block 400, and the attrition rates applied in Block 402, the NPV amount is calculated in Block 404. In this step, the NPV expected values from Block 402 are discounted using rates input by the user when defining the forecast periods. There is only one set of forecast rates for the entire model and there is only one rate for each forecast period.

If the user entered annual rates when setting up the modeling environment, then the NPV amount is calculated as:

$$NPV\ Amount = \sum \frac{NPV\ Expected\ Value_i}{(1+r_i)^i}$$

where:
i=1, ..., n=number of forecast periods, and
$r_i$=annual rate entered by the user for forecast period i.
Aggregate to LTV Object The results of the above calculation are aggregated to the LTV Object and the forecast period for use in the calculation of the LTV amount. In addition, as noted above, the results of the FV calculation will need to be combined with NPV results in Block 308 for the LTV Object and forecast period, so this step is needed to aggregate data for use by the FV calculations as well.

Future Value

FV Calculations

Figure 7:
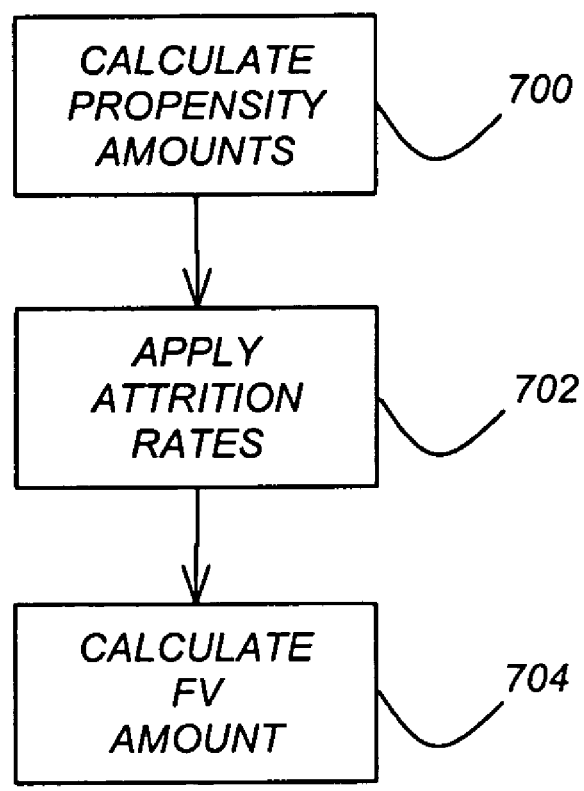
FIG. 7 is a flowchart that further illustrates the steps performed in Block 306 when performing the FV calculations.

FIG. 7 is a flowchart that further illustrates the steps performed in Block 306 when performing the FV calculations.

Block 700 represents the step of calculating propensity amounts for each forecast period for the selected accounts.

Block 702 represents the step of applying attrition rates to the calculated propensity amounts to arrive at FV expected values, wherein the attrition rates comprise a probability that the selected accounts will continue to exist.

Block 704 represents the step of calculating the FV amount by discounting the FV expected values for each forecast period and summing the discounted FV expected values.

These steps are described in more detail below.

Define FV Propensity Rule

The following definition is used for FV propensity rules:
1) FV Propensity Rule Name.
2) Propensity Rate Type:
A) Forecast Component.
B) FV Forecast Amount (a user-entered numerical value).
C) Initial Propensity Source:
   i) User Input.
   ii) LTV Object Propensity Selection Criteria.
   iii) If the user enters a rate as well as selection criteria, then the selection criteria will take precedence.
3) Propensity Method:
A) Forecast Amount Projection:
   i) Projection Type:
      (a) Constant.
      (b) Additive.
      (c) Manual Input.
   ii) Initial Rate.
   iii) Compounding Flag.
B) Propensity Rate:
   i) Constant.
   ii) Negative Compounding.
4) LTV Object Selection Criteria. The user is limited to selection criteria based on LTV Object attributes.
5) Display Effective Propensity Rates:
A) Propensity Type for Manual Input.
B) Propensity Type for Constant or Additive.

Apply FV Propensity Rules

Figure 8:
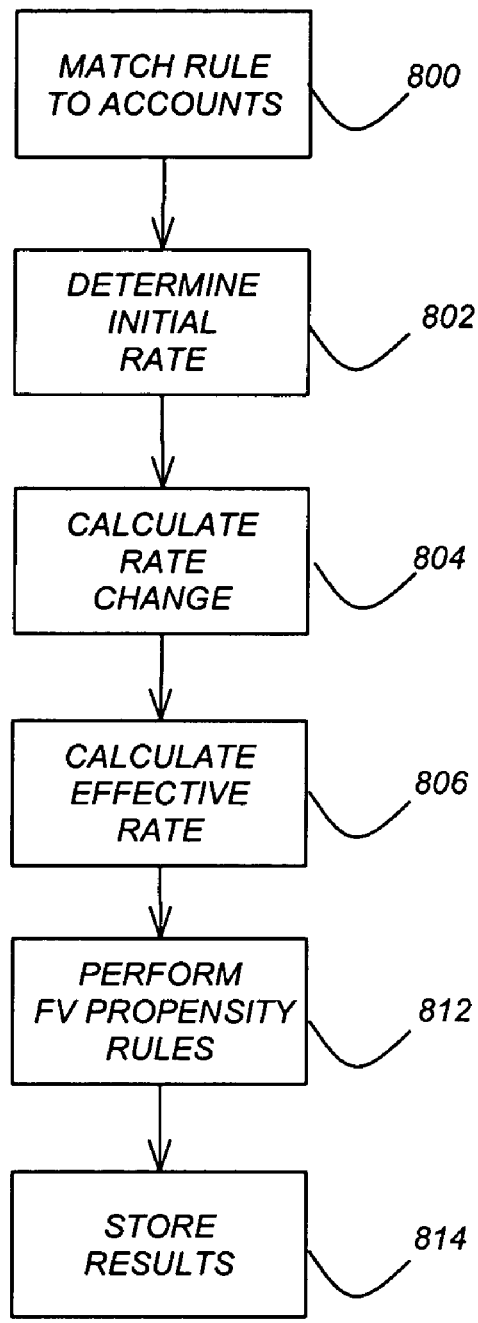
FIG. 8 is a flowchart that illustrates the steps performed in Block 700 when calculating the propensity amounts by applying the FV propensity rules to the selected accounts, as well as the NPV amounts.

FIG. 8 is a flowchart that illustrates the steps performed in Block 700 when calculating the propensity amounts by applying the FV propensity rules to the selected accounts, as well as the NPV amounts.

Block 800 represents the step of matching the FV propensity rule against the selected accounts. This step is performed by a selector function matching selection criteria defined in the FV propensity rule to the baseline account data. The result is a list of accounts satisfying the selection criteria of the rule.

Block 802 represents the step of determining an initial propensity rate for the matched accounts. This step includes the following:
A) If the rule specifies a propensity rate of either LTV Object or both, then match the LTV Object obtained in Block 800 above and the propensity qualifier from the rule definition to the LTV Object propensity data, and use the propensity rate found in the LTV Object. If more than one initial propensity satisfies the selection criteria, these can be added together to obtain a single propensity rate for each LTV Object.
B) If no propensity rate is found or if the rule specifies a propensity source of user input, then use the propensity rate entered by the user.

Block 804 represents the step of calculating a rate change for the matched accounts.

Block 806 represents the step of calculating an effective propensity rate for each forecast period by applying the rate change to each initial propensity rate for each forecast period. This step includes:
A) Apply the rate change formulas provided below to each initial propensity rate for each forecast period.
B) Note that if the source of initial propensity rate is user input, then this calculation only needs to be done once for each FV propensity rule, since the initial rate and projection parameters are the same.

Block 808 represents the step of calculating the FV amount from the FV expected values and the effective propensity rates for each forecast period by performing the FV propensity rules.

Block 810 represents the step of storing the results. The results should be stored at the following level of detail:
A) Cycle Number.
B) Propensity Rule ID.
C) Forecast Component.
D) LTV Object ID.
E) Period 1 through Period n.
F) Expected value amount.

FV Propensity Rules

For Block 812, There are eight general categories of FV propensity rules:
1. Constant (no compounding)
2. Constant (with compounding)
3. Additive (no compounding)
4. Additive (with compounding)
5. Manual (no compounding)
6. Manual (with compounding)
7. Constant Method
8. Negative Compounding The calculations performed in Block 812 by each of these FV propensity rules are provided below. Each of these FV propensity rules can be processed independently of each other. This allows the user to customize the LTV system 100 to process these rules in series (the default) or in parallel.

In the rules, the following variables are used:
$Amount_i$=calculated amount by forecast period,
$Amount_0$=initial amount,
$R_0$=initial rate,
$R_m$=monthly rate,
$R_{man}$=manual rate,
i=forecast period,
j=first month in a forecast period,
k=last month in a forecast period,
n=amortization term,
r=amortization rate, and
$Compounded\_Rate = Rate_1 * Rate_2 * \ldots * Rate_i$.

1. Constant (no compounding):

$$Amount_i = Amount_0 * (1+R_0) * ((k-j+1)/12)$$

2. Constant (with compounding):

$$Amount_i = Amount_0 * (1+R_m)^i * ((k-j+1)/12)$$

3. Additive (no compounding):

$$Amount_i = Amount_0 * (1+i*(R_0/12)) * ((k-j+1)/12)$$

4. Additive (with compounding):

$$Amount_i = Amount_0 * (1+Compounded\_Rate * ((k-j+1)/12)$$

5. Manual (no compounding):

$$Amount_i = Amount_0 * (1+R_{man}) * ((k-j+1)/12)$$

6. Manual (with compounding):

$$\text{Amount}_i = \text{Amount}_0 * (1 + \text{Compounded\_Rate} * ((k-j+1)/12)$$

7. Constant method:

$$\text{Amount}_i = \text{Amount}_0$$

8. Negative Compounding:

$$\text{Amount}_i = \text{Initial Forecast Amount} * (\text{Attrition Rate} * (1 - \text{Attrition Rate})^n)$$

Define FV Attrition Rules
The following definition is used for FV attrition rules:
1) FV Attrition Rule Name.
2) FV Attrition Rate Types:
A) Attrition Rate Source:
 i) User Input.
 ii) LTV Object Data.
 iii) If the enters both (i) and (ii) above, then the LTV Object Attrition Rate takes precedence.
B) FV Attrition Rate Selection Criteria.
3) FV Attrition Rate Method (choose A or B):
A) Project Attrition Rate:
 i) Projection Type:
  (a) Constant.
  (b) Additive.
  (c) Manual Input.
 ii) Compounding Flag.
 iii) Display Effective Attrition Rates:
  (a) Attrition Rate Type for Manual Input.
  (b) Attrition Rate Type for Constant or Additive.
B) Do Not Project Attrition Rate (choose i or ii):
 i) Constant.
 ii) Negative Compounding.
4) FV Propensity Rules.
5) LTV Object Selection Criteria. The user is limited to selection criteria based on LTV Object attributes.

Apply FV Attrition Rules

Figure 9:
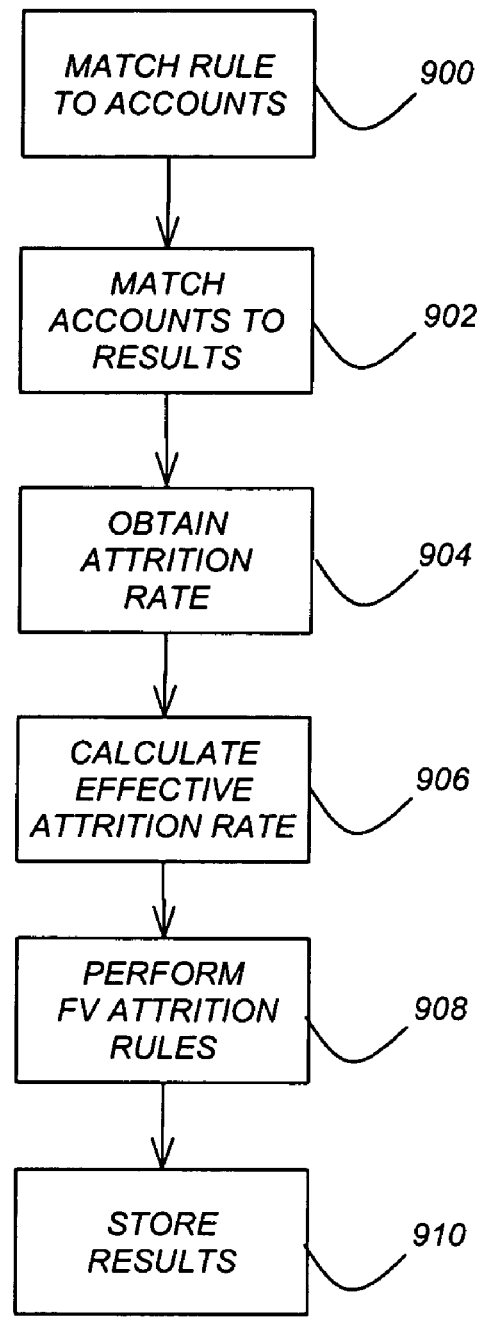
FIG. 9 is a flowchart that further illustrates the steps performed in Block 702 when applying the FV attrition rules to the selected accounts and/or the results of the FV propensity rules.

FIG. 9 is a flowchart that further illustrates the steps performed in Block 702 when applying the FV attrition rules to the selected accounts and/or the results of the FV propensity rules.

Block 900 represents the step of matching the FV attrition rule against the selected accounts. This step is performed by a selector function matching selection criteria defined in the rule to the baseline account data. The result is a list of accounts and their related LTV Objects satisfying the selection criteria of the rule.

Block 902 represents the step of matching the results of the FV propensity rule to the matched accounts.

Block 904 represents the step of obtaining an attrition rate for the matched accounts. The attrition rate may be specified in the rule, or entered by the user, or specified in the account. If more than one attrition rate satisfies the selection criteria, these should be added together to obtain a single attrition rate.

Block 906 represents the step of calculating an effective attrition rate for each forecast period from the attrition rate and a net change rate defined in the FV attrition rule for each forecast period.

Block 908 represents the step of performing the FV attrition rule to calculate the FV expected value using the effective attrition rate. This step includes:
A) Propensity Rule Unattrited Profit Amount=Propensity Rule Amount*(1−Effective Attrition Rate) for each of the forecast periods.
B) Propensity Rule Attrited Profit Amount=Propensity Rule Amount*(Effective Attrition Rate).

After all attrition rate rules have been processed, an attrition rate of zero for all forecast periods should be applied to the FV propensity rule results to which no attrition rates have been applied. This is to insure that all FV propensity rule results will be included in the FV amount.

Block 910 represents the step of storing the results. The results should be stored at the following level of detail:
A) Cycle Number.
B) Attrition rule ID.
C) LTV Object ID.
D) Propensity Rule ID.
E) Period 1 through Period n.
F) Attrited Expected Value.
G) Unattrited Expected Amount.

FV Attrition Rules

For Block 908, there are eight general categories of FV attrition rules:
1. Constant (no compounding)
2. Constant (with compounding)
3. Additive (no compounding)
4. Additive (with compounding)
5. Manual (no compounding)
6. Manual (with compounding)
7. Constant Method
8. Negative Compounding The calculations performing in Block 908 by each of these FV attrition rules are provided below. Each of these rules can be processed independently of each other. This allows the user to customize the LTV system 100 to process these rules in series (the default) or in parallel.

In the rules, the following variables are used:
$\text{Amount}_i$=calculated amount by forecast period,
$\text{Amount}_0$=initial amount,
$R_0$=initial rate,
$R_m$=monthly rate,
$R_{man}$=manual rate,
i=forecast period,
j=first month in a forecast period,
k=last month in a forecast period,
n=amortization term,
r=amortization rate, and
$\text{Compounded\_Rate} = \text{Rate}_1 * \text{Rate}_2 * \ldots * \text{Rate}_i$.

1. Constant (no compounding):

$$\text{Amount}_i = \text{Amount}_0 * (1 + R_0) * ((k-j+1)/12)$$

2. Constant (with compounding):

$$\text{Amount}_i = \text{Amount}_0 * (1 + R_m)^{i*((k-j+1)/12)}$$

3. Additive (no compounding):

$$\text{Amount}_i = \text{Amount}_0 * (1 + i*(R_0/12)) * ((k-j+1)/12)$$

4. Additive (with compounding):

$$\text{Amount}_i = \text{Amount}_0 * (1 + \text{Compounded\_Rate} * ((k-j+1)/12)$$

5. Manual (no compounding):

$$\text{Amount}_i = \text{Amount}_0 * (1 + R_{man}) * ((k-j+1)/12)$$

6. Manual (with compounding):

$$\text{Amount}_i = \text{Amount}_0 * (1 + \text{Compounded\_Rate} * ((k-j+1)/12)$$

7. Constant method:

$$\text{Amount}_i = \text{Amount}_0$$

8. Negative Compounding:

$$\text{Amount}_i = \text{Initial Forecast Amount} * (\text{Attrition Rate} * (1 - \text{Attrition Rate})^n)$$

Calculate Present Value of FV Results

As noted above, after the propensity amounts have been calculated in Block 700, and the attrition rates applied in Block 702, the FV amounts for each forecast period are calculated in Block 704. In this step, the FV expected values from Block 702 are discounted using rates input by the user when defining the forecast periods.

If the user entered annual rates when setting up the modeling environment, then the FV amount is calculated as:

$$FV\ Amount_i = \frac{FV\ Expected\ Value_i}{(1+r_i)^i}$$

where:

i=1, . . . , n=number of forecast periods, and $r_i$=the annual rate entered by the user for forecast period i.

NPV/FV Integration

Calculate LTV for Each LTV Object

After the NPV and FV amounts have been calculated for each LTV Object and forecast period combination, the results need to be integrated to arrive at a final LTV for each LTV Object. This involves the following:

1. Sum the FV amounts across the forecast periods to arrive at a single FV amount.

2. Aggregate the FV amounts for each LTV Object to arrive at a final FV amount for each customer.

3. Match the final FV Amount to the NPV results that were aggregated for the LTV Object and add the two together to arrive at a final NPV/FV amount, i.e., an LTV amount.

Report and Store Results

NPV/FV Results

As noted above, the final step is the LTV system 100 reporting and/or storing the results of the calculations. The results may be reported directly to the LTV Client 102 or another system, such as a CRM system. In addition, the results may be stored, for example, in the RDBMS 106 for further review and analysis.

Calculate Net Change Rate

When defining growth, attrition and propensity assumptions, the user inputs an initial rate, rate change type and indicates a compounding flag. These three parameters are then used to calculate a Net Change Rate for each of the forecast periods. There are three possible rate change types:

1. Constant
2. Additive
3. Manual Input

Since there are two compounding possibilities, compounding or non-compounding, this means there are six formulas which are used to calculate the Net Change Rate in any forecast period.

First, the Net Change Rate for any period needs to be more fully defined. In all the forecast periods, the system 100 starts with an initial amount, $Amount_0$, and needs to forecast what that amount will be in period n, $Amount_n$.

Since the initial amount is known, and the rate at which the initial amount changes is also known, a rate representing the ratio between the forecast amount and the initial amount can be derived and used to represent the Net Change Rate of the initial amount. It is the Net Change Rate, which is calculated and stored to be applied to various initial amount. In this way, the same growth patterns can be applied to various initial amounts.

So, for each forecast period i, the following is defined:

$$Net\ Change\ Rate_i = \frac{Amount_i}{Amount_0} - 1$$

The value 1 is subtracted from the ratio, so the Net Change Rate represents the amount of increase or decrease from the initial amount. Note that the amount needs to be expressed in either months or years to be consistent. Also note that the term "Amount" is used, but this could be any value, such as an initial propensity rate.

In one embodiment, where the forecast period is based on years, the number of months in each forecast period may vary since the first forecast period covers the remainder of the current calendar year. The users then inputs annual rates, which means that the rates must be converted to monthly rates and averaged for the forecast period.

N=the number of forecast periods.

$R_0$=Initial Rate specified by the user.

j=the first month in a forecast period.

k=the last month in a forecast period.

$R_i$=Rate input by the user for forecast period i. Used for manual input rate change type only.

$R_m$=Monthly rate.

Projection Method=Constant, No Compounding

The amount received in any period i is the amount received in the initial period multiplied by 1 plus the rate amount:

$Amount_i = Amount_0 * (1+R_0)$

Not unexpectedly this yields:

Net Change $Rate_i = R_0$

Projection Method=Constant, With Compounding

The rate is compounded for each monthly rate in the forecast period. The amount rate recognized in any month i is:

$Amount_i = Amount_0 * (1+R_0/12)^i$

So, the amount recognized between any two periods is:

$\Sigma Amount_i = \Sigma Amount_0 * (1+R_0/12)^i$

The above equation can be restated as:

$$\sum_{i=j}^{k} Amount_i = Amount_0 * \frac{[(1+R_0/12)^{(k+1)} - (1+R_0/12)^j]}{R_0/12}$$

This means the amount received in any period j through k is expressed by the above equation. If the rate of change were 0, the amount received between period j and k would be:

$\Sigma Amount_0 = (k-j+1) * Amount_0$

This means the Net Change Rate will be:

$$Net\ Rate\ of\ change = \frac{[(1+R_0/12)^{(k+1)} - (1+R_0/12)^j]}{(R_0/12)*(k-j+1)} - 1$$

Projection Method Additive, No Compounding

The rate is additive for each monthly period. So, the amount recognized in any period is given by:

$Amount_i = Amount_0 * (1+i*(R_0/12))$.

So, the amount recognized in a forecast period ranging form j to k is:

$$\sum Amount_i = \sum_{j}^{k} [Amount_0 * (1 + i*(R_0/12))]$$

$$= Amount_0 * (1 + i*(R_0/12))$$

$$= Amount_0 * \left[\sum 1 + (R_0/12) * \sum i\right]$$

$$= Amount_0 * [(k - j + 1) + (R_0/12) * (k - j + 1) * (k + j)/2]$$

If the rate of change were 0, the amount received between period j and k would be:

$\Sigma Amount_0 = (k-j+1)*Amount_0$

This means the Net change rate for any forecast period i:

$$\text{Net Change } rate_i = \frac{[(k - j + 1) + (R_0/12)*(k - j + 1)*(k + j)/2]}{(k - j + 1)} - 1$$

Projection Method Additive, With Compounding

The rate increases each forecast period but it is also compounded by previous period rates. The resulting formula is not a single closed-end formula. This is because the rate for each period varies by an amount determined by the cumulative factors of all previous periods. This is expressed as:

Compounded Net Change Rates for period$_i$=Net Change Rate for period$_1$* ... *Net Change Rate for period$_i$ This implies a two step process to calculate the compounded net change rate for each forecast period:

1. Calculate the additive Net Change Rate for each forecast period.

2. Calculate Compounded additive Net Change Rate using the formula above.

Projection Method Manual Input, No Compounding

The user inputs an average annual rate for each forecast period. This rate only needs to be adjusted for the number of months each forecast period:

$$\text{Net Change } rate_i = \frac{(k - j + 1)R_i}{12}$$

Projection Method Manual Input, With Compounding

This is the same process as with the additive compounding method except the user is inputting the Net Change Rate rather than calculating them.

Compounded Net Change Rates for period$_i$=Net Change Rate for period$_1$* ... *Net Change Rate for period$_i$ This implies a two step process to calculate the average rate for each forecast period:

1. Calculate the monthly rate for all periods

3. Calculate the Compounded Net Change Rate using the formula above

CONCLUSION

This concludes the description of the preferred embodiment of the invention. The following paragraphs describe some alternative embodiments for accomplishing the same invention.

In one alternative embodiment, any type of computer or configuration of computers could be used to implement the present invention. In addition, any database management system, decision support system, on-line analytic processing system, or other computer program that performs similar functions could be used with the present invention.

In summary, the present invention discloses a Life-Time Value (LTV) system that is a data-driven computer-facilitated financial model that provides accurate and consistent profitability projections using current period account level profitability data stored in a Relational Database Management System (RDBMS). The Life-Time Value system performs Net Present Value (NPV) and Future Value (FV) processing using business-rule and data-driven applications that embrace the current period profit components, defines forecast periods, parameters and methodologies, and applies appropriate growth values, attrition values and propensity values to an object of future value interest.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of performing financial processing, comprising:

(a) selecting, in one or more computers, accounts, amounts and rates from account data stored in a database using selection criteria specified by one or more rules; and (b) performing, in the one or more computers, one or more Net Present Value (NPV) calculations on the selected accounts by applying one or more NPV forecast rules to the selected accounts and applying one or more NPV attrition rules to results of the NPV forecast rules using the selected amounts and rates, wherein the NPV calculations determine a present value of an expected profitability value of current products;

(c) wherein applying the NPV attrition rules comprises matching the NPV attrition rule against the selected accounts, matching the matched accounts to the results of the NPV forecast rules, obtaining an attrition rate for the matched accounts, calculating an effective attrition rate for each of one or more forecast periods, performing the NPV attrition rule to calculate an NPV expected value using the effective attrition rate, and storing the NPV expected value in the database; and (d) wherein the NPV attrition rule is selected from a plurality of methods comprising Constant (no compounding), Constant (with compounding), Additive (no compounding), Additive (with compounding), Manual (no compounding), Manual (with compounding), Constant and Negative Compounding methods.

2. The method of claim 1, wherein the NPV is a net present profitability value.

3. The method of claim 1, wherein the selected accounts contain current profitability values.

4. The method of claim 3, wherein the current profitability values are aggregated to provide an initial amount for the NPV calculations.

5. The method of claim 1, wherein the selected amounts are forecast amounts.

6. The method of claim 1, wherein the selected rates are NPV attrition rates.

7. The method of claim 1, wherein a user specifies one or more forecast periods over which the NPV calculations are performed.

8. The method of claim 7, wherein a user specifies one or more rates for the forecast periods.

9. The method of claim 1, wherein the NPV attrition rule comprises a Constant (no compounding) method according to:

$$Amount_i = Amount_0 * (1+R_0) * ((k-j+1)/12)$$

Amount$_i$=calculated amount by forecast period,
Amount$_0$=initial amount,
R$_0$=initial rate,
i=forecast period,
j=first month in a forecast period, and
k=last month in a forecast period.

10. The method of claim 1, wherein the NPV attrition rule comprises a Constant (with compounding) method according to:

$$Amount_i = Amount_0 * (1+R_m)^i * ((k-j+1)/12)$$

Amount$_i$=calculated amount by forecast period,
Amount$_0$=initial amount,
R$_m$=monthly rate,
i=forecast period,
j=first month in a forecast period, and
k=last month in a forecast period.

11. The method of claim 1, wherein the NPV attrition rule comprises an Additive (no compounding) method according to:

$$Amount_i = Amount_0 * (1 + i*(R_0/12)) * ((k-j+1)/12)$$

Amount$_i$=calculated amount by forecast period,
Amount$_0$=initial amount,
R$_0$=initial rate,
i=forecast period,
j=first month in a forecast period, and
k=last month in a forecast period.

12. The method of claim 1, wherein the NPV attrition rule comprises an Additive (with compounding) method according to:

$$Amount_i = Amount_0 * (1+Compounded\_Rate) * ((k-j+1)/12)$$

Amount$_i$=calculated amount by forecast period,
Amount$_0$=initial amount,
i=forecast period,
j=first month in a forecast period,
k=last month in a forecast period, and
Compounded_Rate=Rate$_1$ * Rate$_2$ * ... *Rate$_i$.

13. The method of claim 1, wherein the NPV attrition rule comprises a Manual (no compounding) method according to:

$$Amount_i = Amount_0 * (1+R_{man}) * ((k-j+1)/12)$$

Amount$_i$=calculated amount by forecast period,
Amount$_0$=initial amount,
R$_{man}$=manual rate,
i=forecast period,
j=first month in a forecast period, and
k=last month in a forecast period.

14. The method of claim 1, wherein the NPV attrition rule comprises a Manual (with compounding) method according to:

$$Amount_i = Amount_0 * (1+Compounded\_Rate) * ((k-j+1)/12)$$

Amount$_i$=calculated amount by forecast period,
Amount$_0$=initial amount,
i=forecast period,
j=first month in a forecast period,
k=last month in a forecast period, and
Compounded_Rate=Rate$_1$ * Rate$_2$ * ... *Rate$_i$.

15. The method of claim 1, wherein the NPV attrition rule comprises a Constant method according to:

$$Amount_i = Amount_0$$

Amount$_i$=calculated amount by forecast period,
Amount$_0$=initial amount, and
i=forecast period.

16. The method of claim 1, wherein the NPV attrition rule comprises a Negative Compounding method according to:

$$Amount_i = \text{Initial Forecast Amount} * (\text{Attrition Rate} * (1-\text{Attrition Rate})^n)$$

Amount$_i$=calculated amount by forecast period,
Amount$_0$=initial amount,
i=forecast period, and
n=amortization term.

17. A system for performing financial processing, comprising:
   one or more computers;
   logic, performed by the one or more computers, for:
      (a) selecting accounts, amounts and rates from account data stored in a database using selection criteria specified by one or more rules; and
      (b) performing one or more Net Present Value (NPV) calculations on the selected accounts by applying one or more NPV forecast rules to the selected accounts and applying one or more NPV attrition rules to results of the NPV forecast rules using the selected amounts and rates, wherein the NPV calculations determine a present value of an expected profitability value of current products;
      (c) wherein applying the NPV attrition rules to the selected accounts comprises matching the NPV attrition rule against the selected accounts, matching the matched accounts to the results of the NPV forecast rules, obtaining an attrition rate for the matched accounts, calculating an effective attrition rate for each of one or more forecast periods, performing the NPV attrition rule to calculate an NPV expected value using the effective attrition rate, and storing the NPV expected value in the database; and
      (d) wherein the NPV attrition rule is selected from a plurality of methods comprising Constant (no compounding), Constant (with compounding), Additive (no compounding), Additive (with compounding), Manual (no compounding), Manual (with compounding), Constant and Negative Compounding methods.

18. The system of claim 17, wherein the NPV is a net present profitability value.

19. The system of claim 17, wherein the selected accounts contain current profitability values.

20. The system of claim 19, wherein the current profitability values are aggregated to provide an initial amount for the NPV calculations.

21. The system of claim 17, wherein the selected amounts are forecast amounts.

22. The system of claim 17, wherein the selected rates are NPV attrition rates.

23. The system of claim 17, wherein a user specifies one or more forecast periods over which the NPV calculations are performed.

24. The system of claim 23, wherein a user specifies one or more rates for the forecast periods.

25. The system of claim 17, wherein the NPV attrition rule comprises a Constant (no compounding) method according to:

$$\text{Amount}_i = \text{Amount}_0 * (1+R_0) * ((k-j+1)/12)$$

Amount$_i$=calculated amount by forecast period,
Amount$_0$=initial amount,
$R_0$=initial rate,
i=forecast period,
j=first month in a forecast period, and
k=last month in a forecast period.

26. The system of claim 17, wherein the NPV attrition rule comprises a Constant (with compounding) method according to:

$$\text{Amount}_i = \text{Amount}_0 * (1+R_m)^i * ((k-j+1)/12)$$

Amount$_i$=calculated amount by forecast period,
Amount$_0$=initial amount,
$R_m$=monthly rate,
i=forecast period,
j=first month in a forecast period, and
k=last month in a forecast period.

27. The system of claim 17, wherein the NPV attrition rule comprises an Additive (no compounding) method according to:

$$\text{Amount}_i = \text{Amount}_0 * (1+i*(R_0/12)) * ((k-j+1)/12)$$

Amount$_i$=calculated amount by forecast period,
Amount$_0$=initial amount,
$R_0$=initial rate,
i=forecast period,
j=first month in a forecast period, and
k=last month in a forecast period.

28. The system of claim 17, wherein the NPV attrition rule comprises an Additive (with compounding) method according to:

$$\text{Amount}_i = \text{Amount}_0 * (1+\text{Compounded\_Rate}) * ((k-j+1)/12)$$

Amount$_i$=calculated amount by forecast period,
Amount$_0$=initial amount,
i=forecast period,
j=first month in a forecast period,
k=last month in a forecast period, and
Compounded\_Rate=Rate$_1$ * Rate$_2$ * ... *Rate$_i$.

29. The system of claim 17, wherein the NPV attrition rule comprises a Manual (no compounding) method according to:

$$\text{Amount}_i = \text{Amount}_0 * (1+R_{man}) * ((k-j+1)/12)$$

Amount$_i$=calculated amount by forecast period,
Amount$_0$=initial amount,
$R_{man}$=manual rate,
i=forecast period,
j=first month in a forecast period, and
k=last month in a forecast period.

30. The system of claim 17, wherein the NPV attrition rule comprises a Manual (with compounding) method according to:

$$\text{Amount}_i = \text{Amount}_0 * (1+\text{Compounded\_Rate}) * ((k-j+1)/12)$$

Amount$_i$=calculated amount by forecast period,
Amount$_0$=initial amount,
i=forecast period,
j=first month in a forecast period,
k=last month in a forecast period, and
Compounded\_Rate=Rate$_1$ * Rate$_2$ * ... *Rate$_i$.

31. The system of claim 17, wherein the NPV attrition rule comprises a Constant method according to:

$$\text{Amount}_i = \text{Amount}_0$$

Amount$_i$=calculated amount by forecast period,
Amount$_0$=initial amount, and
i=forecast period.

32. The system of claim 17, wherein the NPV attrition rule comprises a Negative Compounding method according to:

$$\text{Amount}_i = \text{Initial Forecast Amount} * (\text{Attrition Rate} * (1-\text{Attrition Rate})^n)$$

Amount$_i$=calculated amount by forecast period,
Amount$_0$=initial amount,
i=forecast period, and
n=amortization term.

33. An article of manufacture comprising a storage device embodying instructions that, when read and executed by one or more computers, results in the one or more computers performing a method of financial processing, comprising:
(a) selecting, in the one or more computers, accounts, amounts and rates from account data stored in a database using selection criteria specified by one or more rules; and
(b) performing, in the one or more computers, one or more Net Present Value (NPV) calculations on the selected accounts by applying one or more NPV forecast rules to the selected accounts and applying one or more NPV attrition rules to results of the NPV forecast rules using the selected amounts and rates, wherein the NPV calculations determine a present value of an expected profitability value of current products;
(c) wherein applying the NPV attrition rules comprises matching the NPV attrition rule against the selected accounts, matching the matched accounts to the results of the NPV forecast rules, obtaining an attrition rate for the matched accounts, calculating an effective attrition rate for each of one or more forecast periods, performing the NPV attrition rule to calculate an NPV expected value using the effective attrition rate, and storing the NPV expected value in the database; and
(d) wherein the NPV attrition rule is selected from a plurality of methods comprising Constant (no compounding), Constant (with compounding), Additive (no compounding), Additive (with compounding), Manual (no compounding), Manual (with compounding), Constant and Negative Compounding methods.

34. The article of claim 33, wherein the NPV is a net present profitability value.

35. The article of claim 33, wherein the selected accounts contain current profitability values.

36. The article of claim 35, wherein the current profitability values are aggregated to provide an initial amount for the NPV calculations.

37. The article of claim 33, wherein the selected amounts are forecast amounts.

38. The article of claim 33, wherein the selected rates are NPV attrition rates.

39. The article of claim 33, wherein a user specifies one or more forecast periods over which the NPV calculations are performed.

40. The article of claim 39, wherein a user specifies one or more rates for the forecast periods.

41. The article of claim 33, wherein the NPV attrition rule comprises a Constant (no compounding) method according to:

$$\text{Amount}_i = \text{Amount}_0 * (1+R_0) * ((k-j+1)/12)$$

Amount$_i$=calculated amount by forecast period,
Amount$_0$=initial amount,
R$_0$=initial rate,
i=forecast period,
j=first month in a forecast period, and
k=last month in a forecast period.

42. The article of claim 33, wherein the NPV attrition rule comprises a Constant (with compounding) method according to:

$$\text{Amount}_i=\text{Amount}_0*(1+R_m)^i*((k-j+1)/12)$$

Amount$_i$=calculated amount by forecast period,
Amount$_0$=initial amount,
R$_m$=monthly rate,
i=forecast period,
j=first month in a forecast period, and
k=last month in a forecast period.

43. The article of claim 33, wherein the NPV attrition rule comprises an Additive (no compounding) method according to:

$$\text{Amount}_i=\text{Amount}_0*(1+i*(R_0/12))*((k-j+1)/12)$$

Amount$_i$=calculated amount by forecast period,
Amount$_0$=initial amount,
R$_0$=initial rate,
i=forecast period,
j=first month in a forecast period, and
k=last month in a forecast period.

44. The article of claim 33, wherein the NPV attrition rule comprises an Additive (with compounding) method according to:

$$\text{Amount}_i=\text{Amount}_0*(1+\text{Compounded\_Rate})*((k-j+1)/12)$$

Amount$_i$=calculated amount by forecast period,
Amount$_0$=initial amount,
i=forecast period,
j=first month in a forecast period,
k=last month in a forecast period, and
Compounded_Rate=Rate$_1$* Rate$_2$* . . . *Rate$_i$.

45. The article of claim 33, wherein the NPV attrition rule comprises a Manual (no compounding) method according to:

$$\text{Amount}_i=\text{Amount}_0*(1+R_{man})*((k-j+1)/12)$$

Amount$_i$=calculated amount by forecast period,
Amount$_0$=initial amount,
R$_{man}$=manual rate,
i=forecast period,
j=first month in a forecast period, and
k=last month in a forecast period.

46. The article of claim 33, wherein the NPV attrition rule comprises a Manual (with compounding) method according to:

$$\text{Amount}_i=\text{Amount}_0*(1+\text{Compounded\_Rate})*((k-j+1)/12)$$

Amount$_i$=calculated amount by forecast period,
Amount$_0$=initial amount,
i=forecast period,
j=first month in a forecast period,
k=last month in a forecast period, and
Compounded_Rate=Rate$_1$* Rate$_2$* . . . *Rate$_i$.

47. The article of claim 33, wherein the NPV attrition rule comprises a Constant method according to:

$$\text{Amount}_i=\text{Amount}_0$$

Amount$_i$=calculated amount by forecast period,
Amount$_0$=initial amount, and
i=forecast period.

48. The article of claim 33, wherein the NPV attrition rule comprises a Negative Compounding method according to:

$$\text{Amount}_i=\text{Initial Forecast Amount}*(\text{Attrition Rate}*(1-\text{Attrition Rate})^n)$$

Amount$_i$=calculated amount by forecast period,
Amount$_0$=initial amount,
i=forecast period, and
n=amortization term.

* * * * *